Patented May 11, 1937

2,080,101

UNITED STATES PATENT OFFICE 2,080,101

OILING DEVICE

William E. Trumpler, Easton, Pa., assignor to Ingersoll-Rand Company, Jersey City, N. J., a corporation of New Jersey Application March 31, 1934, Serial No. 718,338

3 Claims. (Cl. 308—76)

This invention relates to oiling devices, and more particularly to an oiling device for supplying oil to bearings.

One object of the invention is to assure an adequate supply of oil under pressure to all the cooperating surfaces of the bearing and the shaft journalled therein.

Another object is to embody a suitable pressure lubricating system directly in the bearing thereby eliminating the necessity of conveying lubricant to the bearing from an extraneous source.

Other objects will be in part obvious and in part pointed out hereinafter.

Figure 1:
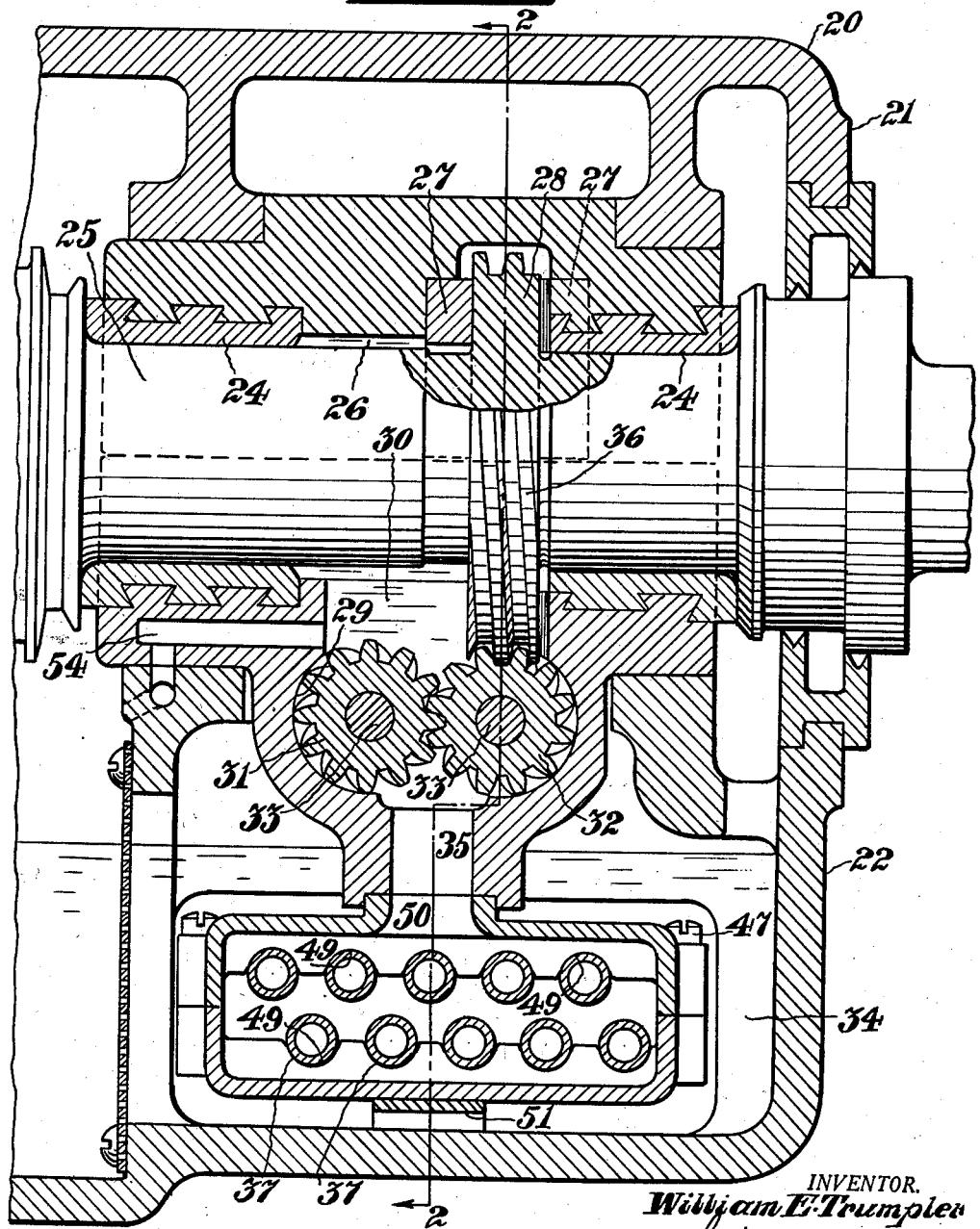
Figure 2:
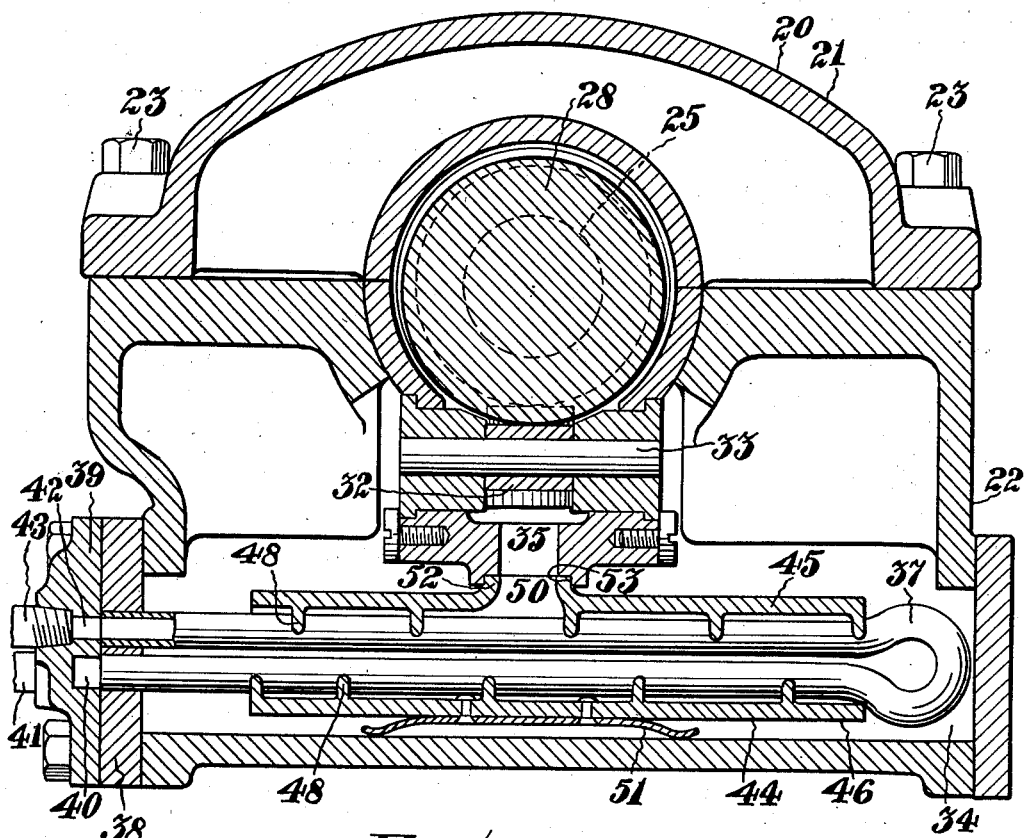

In the drawings accompanying this specification and in which similar reference numerals refer to similar parts, Figure 1 is a longitudinal sectional elevation of a bearing equipped with an oiling device constructed in accordance with the practice of the invention, and Figure 2 is a transverse view taken through Figure 1 on the line 2—2.

Referring more particularly to the drawings, 20 designates, in general, a bearing housing comprising upper and lower sections 21 and 22, respectively, which may be secured together by bolts 23. In the bearing housing sections 21 and 22 are liners 24 which are bored to conform to a shaft 25 for which they serve as bearing surfaces.

The liners 24 may, as illustrated, extend only part way into the ends of the bearing sections. The inner ends of the liners are spaced with respect to each other to provide and form closures for a chamber 26 within the sections 21 and 22 for the passage of lubricant to the bearing surfaces.

Within the bearing sections 21 and 22 and intermediate the liners 24 are thrust blocks 27 which are spaced with respect to each other for the accommodation therebetween of a thrust collar 28 carried by the shaft 25 and of which it may form an integral part.

In accordance with the practice of the invention, the bearing is provided with pumping mechanism embodied therein for supplying lubricant, under pressure, to the bearing surfaces. To this end the bearing section 22 is provided with a pumping chamber 29 adjacent and forming part of the chamber 26 wherewith it communicates through a port 30 which may be of such proportions as to permit the outer portion of the collar 28 to extend therethrough. The chambers 26 and 29 and the port 30 may then be said to form a single chamber which, as it will be seen, contains all of the rotating parts.

Within the pump chamber 29 are a pair of intermeshing helical gears 31 and 32 which may be mounted, as indicated, for free rotation upon shafts 33 seated in the bearing housing. The gears 31 and 32 serve to pump oil from a source of supply, as for instance from a reservoir 34, in the housing section 22 through a port 35 in the section 22 and through the port 30 into the chamber 26.

In the form of the invention illustrated one of the gears, as for instance the gear 32, is disposed in the transverse plane of the thrust collar 28, and the thrust collar is provided on its periphery with a thread or threads 36 which mesh with the teeth of the gear 32 for transmitting the rotary movement of the shaft 25 to the gears.

Means are provided for cooling the oil prior to its delivery to the chamber 26. A plurality of cooling liquid conveying tubes 37 are accordingly disposed within the reservoir 34. The tubes 37, which may consist of any suitable number, are in the form of loops of which the ends are seated in a plate 38 which serves as a cover for one end of the reservoir 34.

Seated upon the plate 38 is a head 39 having an inlet chamber 40 which communicates with the lowermost ends of the tubes and to which cooling liquid is supplied by a conduit 41. The head 39 is, moreover, provided with a discharge chamber 42 to receive the fluid discharged from the other ends of the tubes 37 and such fluid may be conveyed from the chamber 42 by a conduit 43.

In order to retain the tubes in substantially the correct assembled positions a retaining device, designated 44 and comprising an upper plate 45 and a lower plate 46 is disposed about the tubes 37. The plates 45 and 46 may be suitably secured together, as by screws 47, and on their inner surfaces are ribs 48 having partly annular recesses 49 that conform substantially to the contour of the tubes lying therein. In the plate 45 is a port 50 to convey oil to the port 35, and on the bottom of the plate 46 is a spring 51 to maintain a boss 52 encircling the port 50 in engagement with a recess 53 in the bearing.

In the event that the oil pumped by the gears 31 and 32 exceeds the amount required for lubrication of the bearing surfaces the excess oil discharged by the gear pump may be conveniently by-passed to the reservoir, as for instance through a passage 54 in the bearing.

In practice, when the shaft 25 is set in operation its movement is transmitted by means of the threads on the thrust collar to the gear 32 which in turn rotates the gear 31. Oil is then drawn from the reservoir through the ends of the retaining device 44, the ports 50 and 35 into the pumping chamber, whence it is discharged through the port 30 into the chamber 26 to fill the chamber and supply the contacting surface of the shaft, the thrust collar and all the bearings with oil.

During its passage through the retainer the oil contacts with the surfaces of the tubes 37 thus the heat of the oil is transferred to the cooling medium circulating through the tubes and the oil is cooled prior to its delivery to the parts to be lubricated.

I claim:

1. An oiling device, comprising a bearing having a pumping chamber and a reservoir for oil, a shaft in the bearing, a thrust collar on the shaft for transmitting the axial thrust of the shaft to the bearing, a pair of intermeshing helical gears in the pump chamber for pumping oil from the reservoir to the cooperating surfaces of the bearing and the shaft, and a thread on the flange intermeshing with the teeth of one gear for driving the gears.

2. An oiling device comprising a bearing housing member having a bearing therein, a shaft journalled in the bearing, a thrust collar for transmitting the axial thrust of the shaft to the bearing, said collar being on the shaft intermediate the ends of the bearing, a pumping chamber in the housing member closed by the bearing and surrounding and containing therein the collar and the mid-section of the shaft, an oil reservoir communicating with said chamber, a thread described on the collar, and pump gears in the pumping chamber meshing with said thread whereby the shaft drives the gears to pump oil from the reservoir into the pumping chamber, the oil filling the chamber to surround the mid-section of the shaft and the collar and to come into immediate contact with the parts of the bearing closing said chamber to force oil into the bearings and onto the thread without the aid of passages in the bearing housing member.

3. An oiling device comprising a casing having a bearing housing member therein, bearings in opposite ends of the housing member, a shaft journalled in the bearings, a thrust collar on the shaft between said bearings, a third bearing for the thrust collar, a pumping chamber in the housing member surrounding and containing the shaft and collar and said third bearing between said first-mentioned bearings, said first-mentioned bearings forming closures for the pumping chamber, an oil reservoir, a thread described on the collar, and pump gears in the chamber also journalled in the housing member and driven by the shaft through said thread whereby oil from the reservoir is delivered to the chamber to fill the chamber and surround the shaft, the collar and the bearing for the collar with oil, and to bring the oil into contact with the ends of the closure forming bearings thereby to simultaneously lubricate the thread and all the bearings without the aid of passages in the bearing housing member or in the bearings.

WILLIAM E. TRUMPLER.